C. W. Reeder,
Fence.
No. 3980. Reissued May 17. 1870.
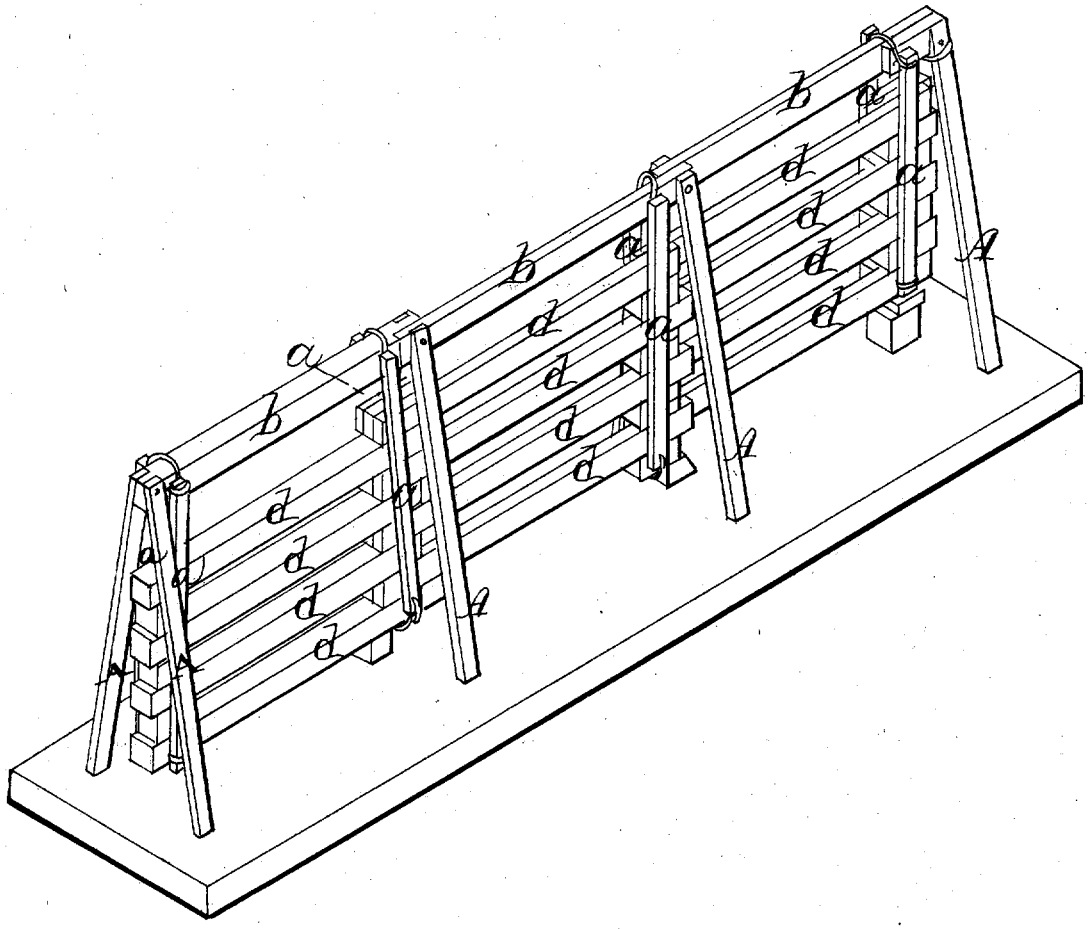
Witnesses
A. Smith
C. Alexander
Inventor
C. W. Reeder
Per
T. H. Alexander
Atty
N. PETERS, PHOTO-LITHOGRAPHER, WASHINGTON, D. C.

United States Patent Office.

CHARLES W. REEDER, OF CHILLICOTHE, MISSOURI.

*Letters Patent No.* 92,359, *dated July* 6, 1869; *reissue No.* 3,980, *dated May* 17, 1870.

IMPROVEMENT IN FARM-FENCE.

The Schedule referred to in these Letters Patent and making part of the same

*To all whom it may concern:*

Be it known that I, CHARLES W. REEDER, of Chillicothe, in the county of Livingston and State of Missouri, have invented certain new and useful Improvements in Farm-Fences; and I do hereby declare that the following is a full, clear, and exact description thereof, reference being had to the accompanying drawing and to the letters of reference marked thereon which form a part of this specification.

The nature of my invention consists in the employment of V-shaped supports, provided with swinging bars into which are inserted the fence-rails, substantially as hereinafter specified.

In order to enable others skilled in the art to which my invention appertains to make and use the same, I will now proceed to describe its construction and operation, referring to the annexed drawing, in which is represented a perspective view of my fence.

A A represent supports made in the shape of an inverted V, and provided at their upper ends with the bars *b b*.

Each panel or section of fence has two supports.

The upper bars *b b* overlap each other at their ends, as seen in the drawing.

*a a* represent parallel bars, which are secured together at their upper ends, over the upper bars *b b*, by wires, with a corresponding wire securing their lower ends.

In the suspended parallel bars *a a* are secured the fence-rails or plank *d d*, each rail or plank overlapping the rails in the succeeding panel.

The above is more particularly for a stationary fence, in which case the bars *b b* are secured between the upper ends of the supports, by nails or pins driven through the same.

Each support has a wire fastening, C, passing around the support near the upper end, and the top bars catch or rest on the same.

The wire fastening C may be used as well on stationery as on portable fences.

By this arrangement the fence can be hung from any desired distance from the ground, thereby preventing the bottom rails from rotting.

Having thus fully described my invention,

What I claim as new and desire to secure by Letters Patent, is—

1. The supports A A and fastenings C, for supporting and retaining the top bars *b b*, substantially as and for the purposes herein set forth.

2. The parallel bars *a a*, in combination with the supports A A, and with the fastenings C, substantially in the manner and for the purpose described.

3. The combination of the supports A A, top bars *b b*, parallel bars *a a*, rails *d d*, and the fastenings C, all constructed and arranged substantially in the manner and for the purposes herein set forth.

In testimony that I claim the foregoing as my own, I affix my signature in presence of two witnesses.

CHARLES W. REEDER.

Witnesses:

JOSEPH REEDER,
WM. FISH.